May 19, 1959 H. M. VOGLESONGER ET AL 2,887,036
BEVERAGE BREWING APPARATUS
Filed Jan. 4, 1956 7 Sheets-Sheet 1

Fig. 1.

INVENTOR.
HARRY M. VOGLESONGER.
BY MORTON DIAMOND.
Louis V. Lucia
ATTORNEY.

May 19, 1959 — H. M. VOGLESONGER ET AL — 2,887,036
BEVERAGE BREWING APPARATUS
Filed Jan. 4, 1956 — 7 Sheets-Sheet 3

INVENTOR.
HARRY M. VOGLESONGER.
BY MORTON DIAMOND.
Louis V. Lucia
ATTORNEY.

May 19, 1959 H. M. VOGLESONGER ET AL 2,887,036
BEVERAGE BREWING APPARATUS
Filed Jan. 4, 1956 7 Sheets-Sheet 5

INVENTOR.
Harry M. Voglesonger.
BY Morton Diamond.

Louis V. Lucia

ATTORNEY.

INVENTOR.
HARRY M. VOGLESONGER.
BY MORTON DIAMOND.

ATTORNEY.

May 19, 1959 H. M. VOGLESONGER ET AL 2,887,036
BEVERAGE BREWING APPARATUS
Filed Jan. 4, 1956 7 Sheets-Sheet 7

| TIMER SWITCHES | | |
|---|---|---|
| NO. 141 | | MOTOR |
| " 142 | | INJECTION & BREW |
| " 143 | | DECANT |
| " 144 | | DRAIN |
| " 145 | | RINSE |
| MINUTES | | |

OPEN   CLOSED

INVENTOR.
HARRY M. VOGLESONGER.
BY MORTON DIAMOND

Louis V. Lucia

ATTORNEY.

United States Patent Office 2,887,036
Patented May 19, 1959

2,887,036
BEVERAGE BREWING APPARATUS

Harry M. Voglesonger, Riverton, and Morton Diamond, West Hartford, Conn., assignors to The Silex Company, Hartford, Conn., a corporation of Connecticut Application January 4, 1956, Serial No. 557,301

2 Claims. (Cl. 99—289)

This invention relates to a beverage brewing apparatus and more particularly to a device which will operate automatically to produce a brew of coffee or other beverage.

An object of the present invention is to provide certain improvements in the brewing device shown and described in the copending application of Lars Svendsgaard, Serial No. 141,260, filed January 30, 1950, now Patent No. 2,730,034, issued on January 10, 1956 which will facilitate the use and operation of the device and also render it more efficient in its operation and reduce the cost of manufacture.

A still further object of the present invention is to provide an improved filter for such brewing apparatus.

Further objects and advantages of this invention will be more clearly understood from the following description and from the accompanying drawings in which.

As shown in the drawings, my improved brewing apparatus includes a casing having a base 5 upon which there is mounted a shell which includes side walls 6—6 and a front wall consisting of portions 7, 8 and 9.

A top wall is provided by means of an inverted cover plate 10 which fits over a band 11 that secures the wall portions of the case together.

The mechanism of the said apparatus is contained within the said case and includes a water heating tank 12 having an electrical heating element 13 therein that is controlled by a suitable thermostat 14 for maintaining the brew water at a predetermined temperature during the brewing operation.

The said apparatus also has a brew tank 15, at the upper portion of the case, which is preferably supported upon the cover plate 10 by means of an annular bead 16 that surrounds the top edge of the said brew tank and rests upon the cover plate.

Figures 3, 4, 5, 6:
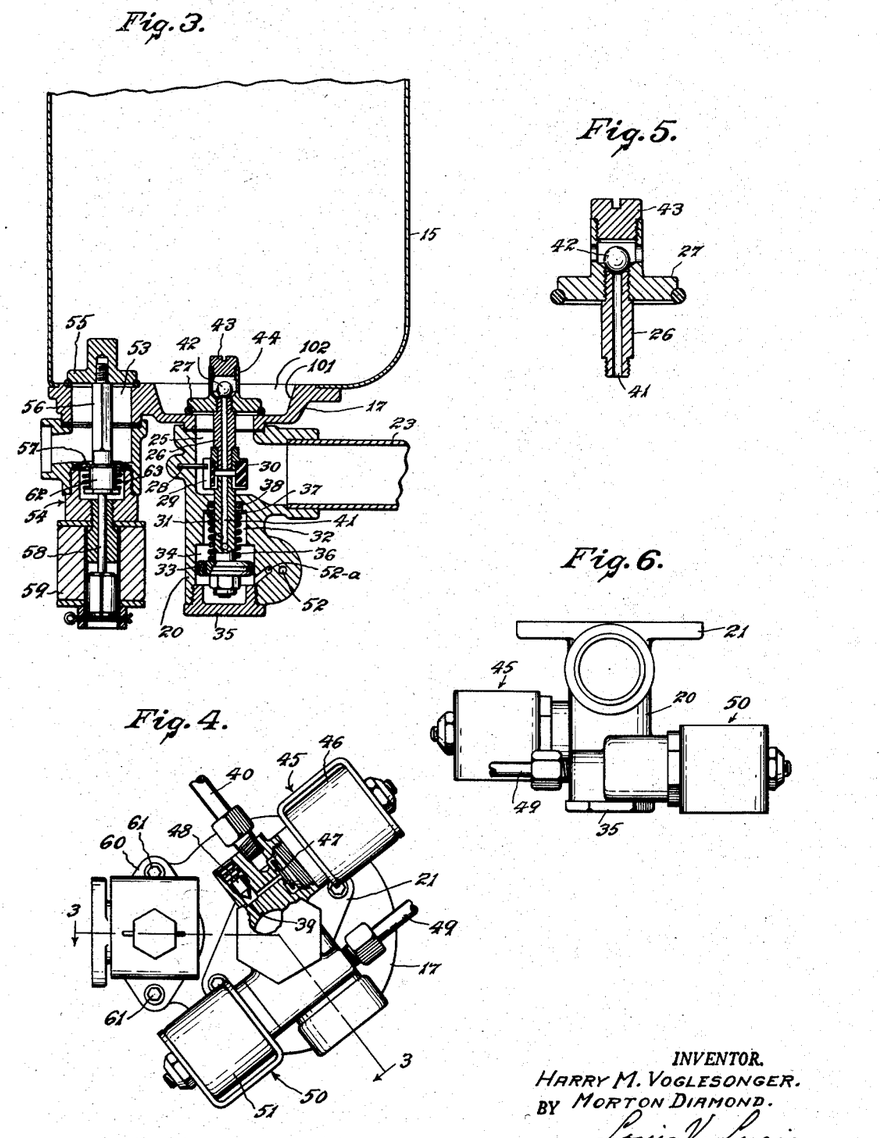
Fig. 3 is a sectional side view of the hot water supply, coffee grounds drainage and brew dispensing valves taken on line 3—3 of Fig. 4.
Fig. 4 is a bottom view, partly in section, of said valves.
Fig. 5 is an enlarged side view of the gravity valve used in said valve mechanism.
Fig. 6 is a rear view of values as shown in Fig. 3.

At the bottom of the brew tank there is mounted a valve mechanism for controlling the injection of hot brew water, the dispensing of the brew and the disposal of the used coffee grounds. The said valve mechanism is preferably constructed as shown in the drawings and includes a supporting plate 17 that is secured to the bottom of the brew tank and has mounted thereon a combination injection and draining valve 18 which is connected to a discharge opening 19 that is disposed coaxially with the brew tank 15. The said valve 18 preferably includes an injection valve 18–a and a draining valve 18–b which are contained in a casing 20 having a flange 21 by means of which it is secured to the bottom of the plate 17. The said case has an extension 22 to which is connected a drainage pipe 23 that extends to a suitable manifold 24 that may be connected to an appropriate drainage system.

The said valve 18 has an axial disposal passage 25 within which there is contained the hydraulically operated drain valve which includes an axial stem 26 that is vertically slidable in said case and has mounted at its upper end a valve head 27 which is adapted to open and close the discharge opening 19. The said valve stem 26 is prevented from rotating within the valve casing by means of a pin 28 which projects inwardly from the wall of the recess 19 into a slot 29 in a flexible connector 20 which allows the head 27 to seat properly in case of a misalignment of the stem 26.

An operating stem 31 is connected to said stem 26 by means of said connector 30 and is contained within a lower passage chamber 32. A piston 33 is connected to the said stem 31 and is slidable within an inverted liquid chamber 34 that is connected with the chamber 32 and is closed by a bottom plug 35. A drain valve closing spring 36 surrounds the stem 31 and is contained between the piston 33 and a washer 37 which retains a sealing ring 38 in position to seal the opening between the recess 32 and the discharge opening 19 through which the stem 31 extends.

A hot water supply passage 39 is connected to a hot water supply pipe 40 from the heating tank 12 and communicates with the upper portion of the liquid chamber 34. A passage 41 is provided through the stems 31 and 26 which communicates the said chamber 34 with the interior of the brew tank 15 through a check valve 42 having a ball 43 which normally closes the passage 41 and is contained within a retaining shell 44 having apertures in the wall therein to provide communication between the passage 41 and the interior of the brew tank when the ball 43 is raised by the flow of brew water through said check valve.

The supply of hot brew water to the brew tank, through the said valve 18, is controlled by means of a solenoid valve 45 which includes a suitable solenoid 46 that operates a valve plunger 47 which controls the flow of the water from the supply pipe 40 through the passage 39 which is intersected by a suitable metering valve 48 that is adjustable to regulate the flow of liquid through the said passage 39 when the solenoid valve 36 is in open position.

The lower portion of the chamber 34 is connected to the cold water supply pipe 49 and the flow of water under pressure to the said lower portion of the cylinder is controlled by a suitable solenoid valve 50 which includes a solenoid 51 that operates a plunger 52-a, which intersects the passage 52 between the supply pipe 49 and the lower portion of the said chamber 34.

The completed brew is emptied from the brew tank 15 through an opening 53 at the bottom of the tank in the plate 17, which opening is opened and closed by a decant solenoid valve 54 that is provided for controlling the flow of the brew through said opening and preferably also mounted upon the supporting plate 17. The said valve 54 includes a valve head 55 which overlies the said opening 53 and is operated by a valve stem 56 that is supported by a flexible diaphragm 57, to permit self-alignment of the head 55 with the valve seat surrounding the opening 53, and is moved in a vertical direction by a plunger 58 which is operated by a solenoid 59. In the construction shown, the said valve 54 is preferably secured to the plate 17 by means of a flange 60 and screws 61—61 which extend through said flange and are threaded to the plate 17. The solenoid 59 is mounted to the said valve housing by means of a connector 62 that is threaded to the housing and clamps the diaphragm 57 in position therein. A spring 63 is provided for urging the valve stem 56 downwardly to normally force the valve head 55 into closed position.

Figure 1:
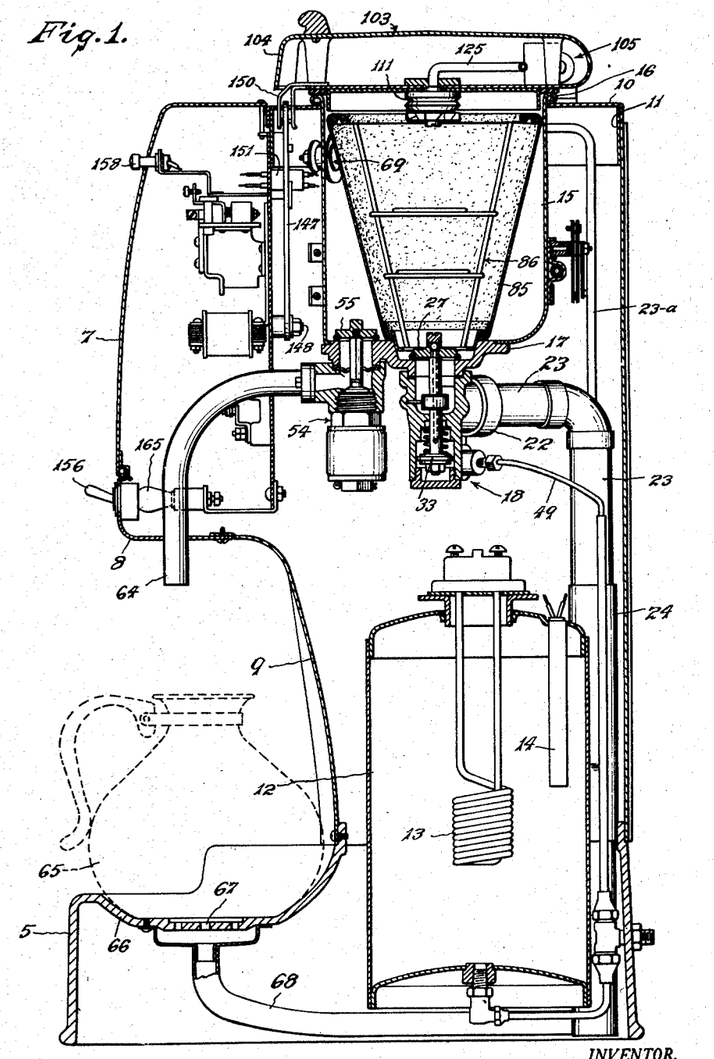
Fig. 1 is a sectional side view of my improved brewing apparatus.
Figure 2:
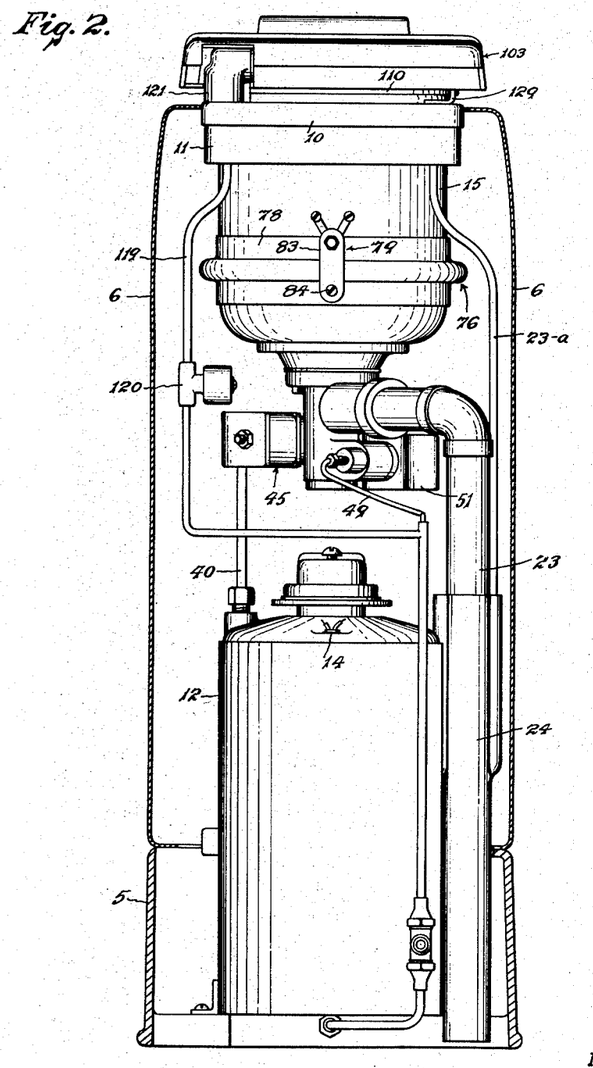
Fig. 2 is a rear view of said apparatus, partly in section.

The said decant valve has connected thereto a spout 64 which extends downwardly through the portion 8 of the casing and is adapted to dispense the brew from the brew tank 15 into a suitable dispensing receptable 65, such as indicated in dotted lines, which may be placed in the supporting tray 66 that has drain openings 67 in the bottom thereof which are connected with the main drain pipe 24 through a drain pipe 68 so as to drain the said tray of any brew that may drip from the spout 64 when the serving container is removed.

Figure 15:
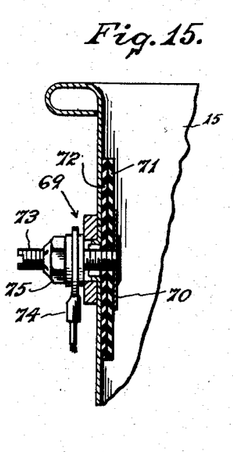
Fig. 15 is a sectional side view of a level control device used in said brew tank.
Figure 16:
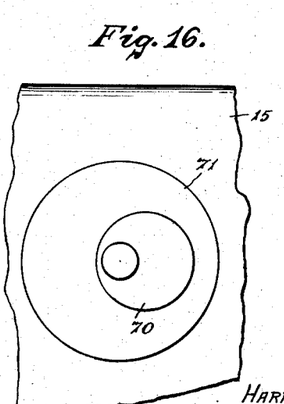
Fig. 16 is an inside view of said level control device.

The level to which the brew tank is filled with the hot brew water is determined by means of a suitable probe 69 that includes an electrode 70 which is extended through the wall of the brew tank and is located at a predetermined height to control the level to which the brew tank is to be filled with the hot water. The said electrode is insulated from the brew tank by suitable insulating washers 71 and 72 and has a threaded post 73 to which an electrical connector 74 may be attached by means of a clamping nut 75. A pipe 23-a is connected to the brew tank at a plane slightly higher than the said probe to conduct any overflow to the drain pipe 23.

Figure 14:
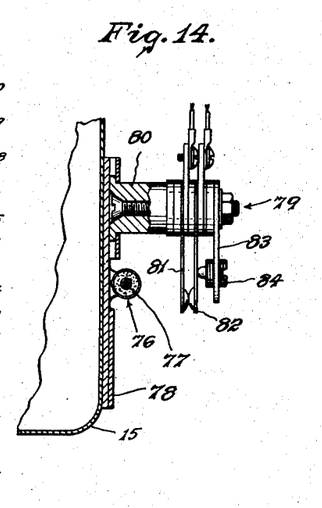
Fig. 14 is an enlarged side view of the temperature control thermostat for the brew tank.

The water in said brew tank is maintained at a desired temperature by means of an auxiliary heating element 76 which comprises an electrical resistance 77 that is clamped to the exterior of the brew tank 15 by an annular band 78 and is controlled to maintain the hot brew water at a predetermined temperature by means of a suitable thermostat 79, the said thermostat preferably consisting of a post 80 upon which are mounted a pair of normally closed contacts 81 and 82 that are opened by a thermally responsive bar 83 upon the water in the brew tank reaching the predetermined temperature for which the said thermostat is pre-adjusted by means of a set screw 84.

Figure 17:
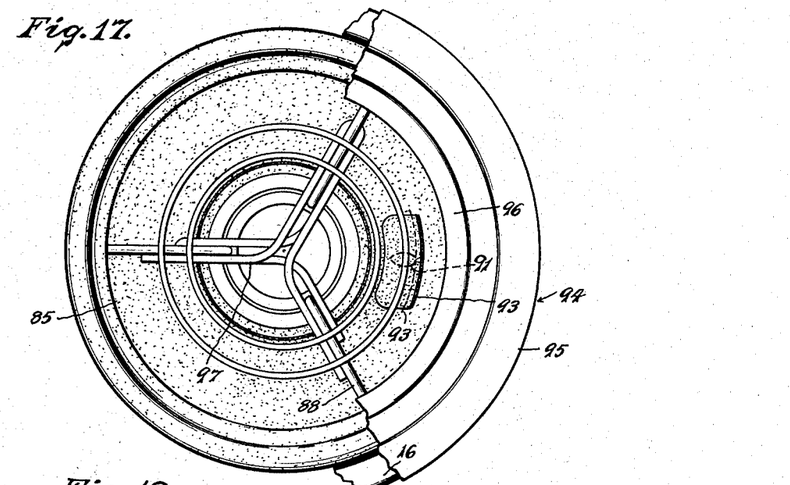
Fig. 17 is an enlarged plan view of the coffee grounds filter used in my improved apparatus.
Figure 18:
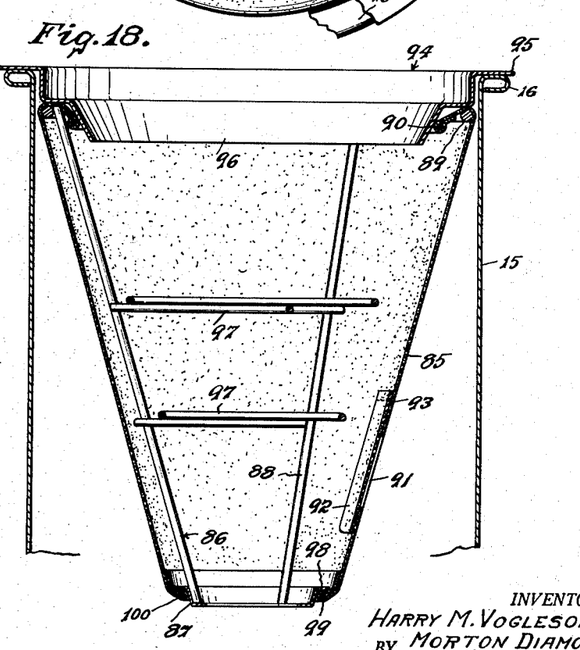
Fig. 18 is a sectional side view of said filter.

A coffee grounds container and filtering device is provided within the brew tank 15 to contain the coffee grounds and filter them from the brew as the brew is emptied from the brew tank through the spout 64 upon the opening of the valve 54. The said filtering device preferably consists of a cloth filter bag 85 that is mounted upon a suitable wire frame 86 which consists of a lower ring 87 having upright suporting members 88 secured to and extending upwardly therefrom and an upper supporting ring 89. The filter bag 85 is mounted over the said frame and supported in its conical form by means of said wire frame to which it is secured by suitable means, such as a drawstring 90. The said filter bag is also provided with a flexible valve in the side thereof which consists of an opening 91 in said member and a closure flap 92 that is also constructed of cloth and sewn to the bag at 93 so that it will normally lie in position to close the opening 91 by gravity and thereby prevent coffee grounds from passing outwardly through the opening 91 but allow rinse water to pass through said opening into the filter for speeding the draining of the brew tank following a rinsing operation.

The filtering device fits within the brew tank with its upper annular edge disposed adjacent the inner walls of the tank and a funnel ring 94 is placed over the top of the said filtering device and has an upper outwardly extending flange 95, which lies upon the bead 16 of the brew tank, and a lower flange 96 which extends downwardly and inwardly into the filtering device to funnel coffee grounds into it and prevent them from passing between the filtering member and the wall of the brew tank into the brew water exteriorly of the filtering device. The frame 86 is also provided with breaker wires 97—97 that are mounted upon the upright supporting members 88 and extend across the interior of the filter bag to submerge and break up the coffee grounds as the brew water rises within the brew tank and bag. The ring member 87 is formed of sheet metal and is provided with an annular flange 98 to which the lower peripheral edge 99 of the filter member is anchored by means of a wire ring 100. The sides of the said ring 87 are tapered downwardly and inwardly so as to fit the tapered walls 101 of the recess 102 at the bottom of the brew tank 15.

Figure 7:
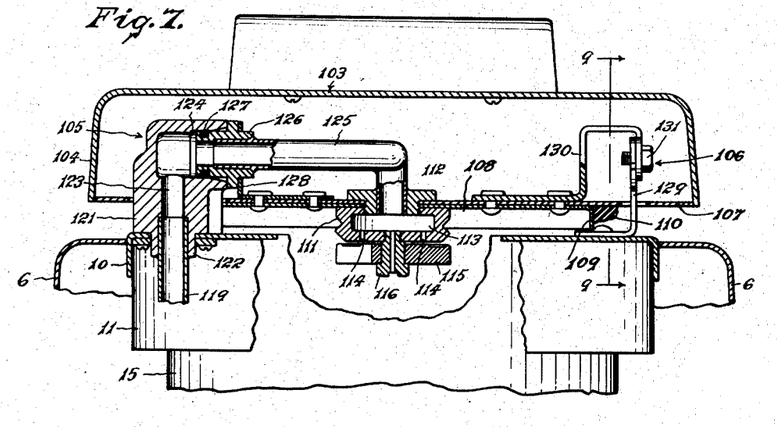
Fig. 7 is an enlarged sectional front view of the upper portion of my improved apparatus.

The top of the brew tank 15 is closed by means of a cover 103 which includes an outer supporting member 104 that is hinged at 105 and 106 and carries a bottom plate 107 to which is attached an inverted dish-shaped member 108 having a downwardly projecting annular flange 109 around which is mounted a resilient sealing gasket 110 that is adapted to engage the flange 95 of the funnel ring 94 for closing the said brew tank.

Figure 10:
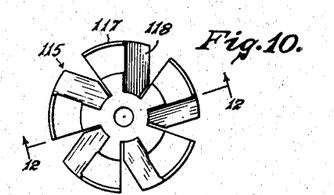
Fig. 10 is a side view of the spray spreader wheel used in said apparatus.
Figures 11, 12:
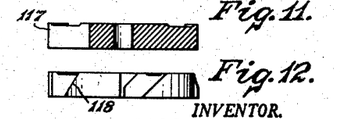
Fig. 11 is a bottom view of said wheel.
Fig. 12 is a sectional view on line 12—12 of Fig. 11.

The said cover carries, upon the bottom thereof, a spraying device which includes a spray head 111 that is attached to a nipple 112 that extends through the bottom plate 107. The said spray head has a cavity 113 therein and a series of spray jets 114 which extend from said cavity through the bottom wall of the head. A spray spreader in the form of a wheel 115 is rotatably mounted upon the bottom of said head, by means of a stud 116, and said wheel has a plurality of radial blades 117 with angular sides 118 which cause the wheel to be rotated by the force of the water discharged downwardly through the jets 114.

The said sprayer device is connected with the cold water pipe 49 through an extension 119 and the flow of the water through said spray device is controlled by a suitable solenoid valve 120.

As shown in Fig. 7, the water connection from the spray device to the cold water pipe is made through the hinge 105 which includes a supporting member 121 that is mounted upon the top plate 10 and has an extension 122 which extends downwardly through said plate and a vertical passage 123 that communicates with a horizontal recess 124 in said supporting member. The supply pipe 119 is connected to the said extension to communicate with the vertical recess and a separate pipe section 125 is connected to the nipple 112 of the spray device and to a connector 126 which extends into the horizontal recess 124 and has a sealing ring 127 to prevent leakage past the said connector which is rotatably retained in the recess 124 by means of a bracket 128 that is secured to the lower plate 107.

The hinge 106, at the opposite side of the cover 103, is in axial alignment with the connector 126 and includes a stationary supporting bracket 129, that is also mounted upon the top plate 10, and a movable connecting bracket 130 which is secured to the plate 107 and hingedly connected to the bracket 129 by means of a hinge stud 131. The said bracket 129 has a stop projection 132 which is engaged by the movable bracket 130 to retain the cover 103 in its open position.

Figure 8:
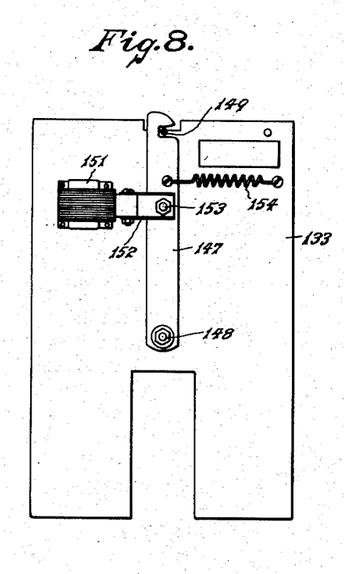
Fig. 8 is a rear view of the control panel of said apparatus.
Figure 9:
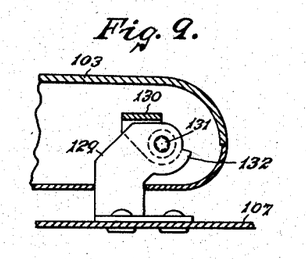
Fig. 9 is a sectional side view on line 9—9 of Fig. 7.
Figure 13:
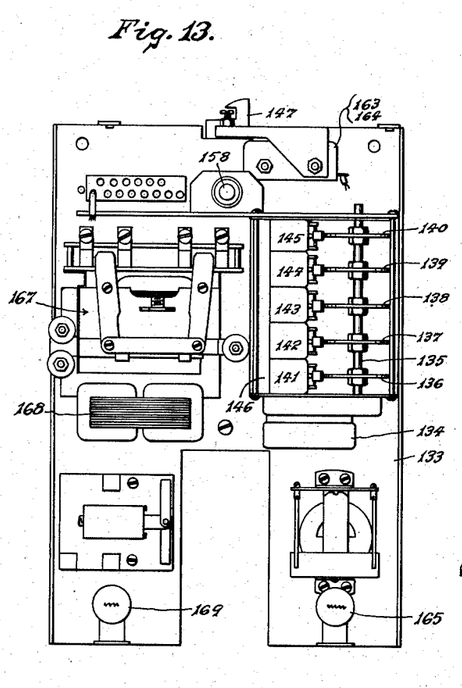
Fig. 13 is a front view of the control panel.
Figure 20:
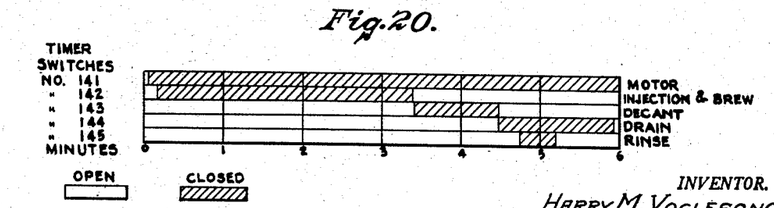
Fig. 20 is a diagram illustrating the sequence of the automatic operation of my improved device during a brewing cycle.

A control panel 133 is preferably mounted inwardly of the cover portion 7 of the case so that the instruments on the control panel may be rendered readily accessible by merely removing the said cover portion. Said instruments include a plurality of switches, relays and other devices which are connected in an electrical circuit, as shown in Fig. 20, for causing the automatic operation of the brewing device and the said switches and relays are preferably controlled by a conventional electric timer of the synchronous type which is contained within a case 134 and is adapted, through a gear train in said case, not shown, to rotate a timer shaft 135 having thereon a plurality of cam disks, 136, 137, 138, 139 and 140 which are adapted to operate a series of electric switches, respectively, 141, 142, 143, 144 and 145 that are mounted upon a suitable bracket 146 whereby they are positioned adjacent to the said cam disks.

The said control panel 133 has also mounted thereon a latching bar 147 which is hinged upon a stud 148 projecting from the rear of the said panel and extends upwardly and is adapted to engage a latching pin 149 on a keeper 150 that extends downwardly from the cover 103. A solenoid 151 is also mounted upon the rear of the control panel and is connected to the latching bar 147 by means of a link 152 that is pivotally secured to the latching bar by a stud 153. A spring 154 is anchored to the control panel 133 and is secured to the said latching bar to bias it towards latching position.

Figure 19:
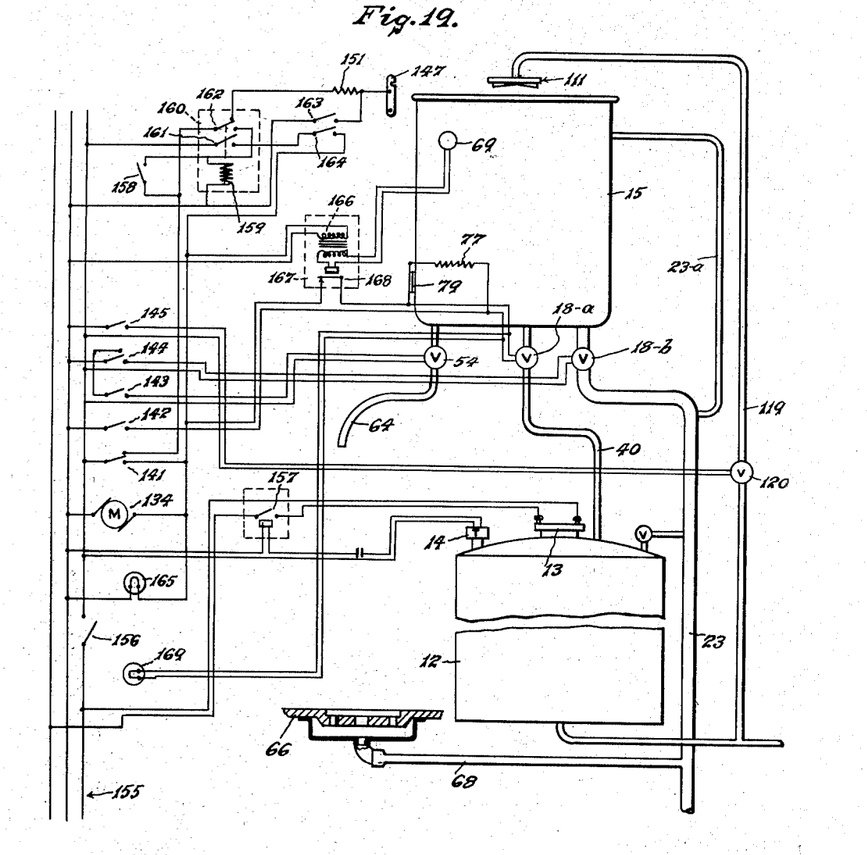
Fig. 19 is a diagrammatic view illustrating the electric circuit for automatically controlling the operation of my improved brewing apparatus.

The electric circuit for controlling the automatic operation of my improved brewing device is clearly illustrated in Fig. 19 as being connected to a conventional three wire power supply indicated at 155 and all the switches in said circuit are shown in their normal positions.

Assuming that the main switch 156 is closed, the sequential mode of operation of my improved brewing device is as follows:

Energization of the heating element 13 will be controlled by the relay switch 157 which is operated by the thermostat 14 to maintain the water in the tank 12 at a desired temperature.

When it is desired to produce a brew of coffee in said brewing device, a pre-measured amount of coffee is first poured into the filter bag 85 and the brewing operation may be initiated by simply first closing the starter switch 158 and then closing the cover 103. Closing of the said starter switch will cause energization of the relay coil 159 so that the relay 160 will be actuated to close the switch 161 and move the switch 162 to its down position. The starter switch 158 may now be released and allowed to open and the switch 141 will retain the coil 159 energized while said switch is in its normal position. The cover 103 must now be closed manually and this will close the switches 163 and 164 and energize the timer motor 134, through the switches 161 and 164, to cause timed rotation of the cam disks 136 to 140 for operating the switches 141 to 145.

The cam disk 136 will next move the switch 141 to its down position wherein it will close the circuit directly to the motor 34, de-energize the relay coil 159 and allow the switches 161 and 162 to return to their normal positions. The motor will then be kept energized by the switch 141 which will remain in its down position throughout the remainder of the cycle for the brewing operation that has now been initiated. Energization of the motor will also cause energization of the green light 165 to indicate that the said motor is in operation.

For the next step of the brewing cycle, the disk 137 will close the switch 142 and energize the solenoid injection valve 18–a to thereby cause the injection of hot water from the tank 12 into the brewing chamber. The said hot water will then pass through the pipe 40 into the chamber 34 and, from there, through the passage 41 in the stems 26 and 31 and through the ball valve 42 into the brewing tank 15, wherein the said water will enter through the open bottom of the filter bag 85 and become infused with the coffee grounds therein.

Simultaneously with the energization of the injection valve 18–a, the brew heater 77 will also become energized and the said heater will be controlled by the thermostat 29 to maintain the brew tank at a predetermined temperature.

The injection of hot water into the brew tank will continue until the water reaches the level of the probe 69; whereupon the water will bridge between the wall of the tank 15 and the electrode 17 and, through the transformer 166, energize the relay 167 and open the switch 168; thereby de-energizing the injection solenoid 18–a, so that it will close, and terminating the injection of hot water into the brew tank.

In the next steps of the brewing cycle, the switch 142 will be opened to thereby de-energize and close the injection valve 18–a and the switch 143 will be closed by the disk 138 to energize and open the solenoid decant valve 54 for emptying the completed brew from the brew tank into the dispensing receptacle 65.

After the decant valve 54 has remained open for a predetermined period of time sufficient to permit emptying of the completed brew from the brew tank, the switch 143 will open to close the decant valve 54 and the switch 144 will close to open the drain valve 18–b which will then be held open for the remaining portion of the brewing cycle. After the said drain valve has opened, the switch 145 will be closed by the cam disk 140 to open the solenoid rinse valve 120 and cause cold water to flow through the sprayer head 111. This water will be directed downwardly into the drain opening 19, by the jet opening 116–a, and also dispersed downwardly and against the walls of the brew tank and into the filter bag 85, by the spray wheel 115, so as to rinse the tank and stir the grounds in said bag to cause them to be carried with the rinse water through the drain valve 18–b into the drain pipe 23. After a predetermined period of time, the said rinse valve 120 will be closed and the valve 18–b will remain open to complete the draining operation. The switch 144 will then be opened, to close the drain valve 18–b. Shortly after that, the switch 141 will be returned to its normal position, as shown in Fig. 19, and this will cause de-energization of the motor 134 and also of the relay coil 159 which will release the switches 160 and 161 into their normal position, as also shown in Fig. 19, whereupon the switch 161 will energize the solenoid 168 to operate the latch 147 and release the cover 103. The said cover will then open, under the pressure of the rubber gasket 110, and cause opening of the switches 162 and 163, whereupon the solenoid coil 151 and the motor 134 will become de-energized and the brewing cycle is thereby completed.

It will be noted that the red light 169 will remain energized throughout the time period that the injection of hot water into the brew tank is taking place through the solenoid valve 18–a; the said light being controlled by the switch 142 simultaneously with the opening and closing of the injection valve 18–a.

It will be noted that the red light 169 is controlled by the switch 142 simultaneously with the opening and closing of the injection valve 18–a so that the said light will remain energized throughout the time period that hot water is being injected into the brew tank.

I claim:

1. In a beverage brewing apparatus, a brewing chamber, a hydraulically operated valve including a casing having a disposal passage therein and a liquid chamber below said passage, a valve head for controlling the flow of liquid from said brewing chamber into said disposal passage, a stem extending downwardly from said head through said disposal passage, the said casing having an opening into said liquid chamber, the said stem being divided and having an operating portion extending through said opening and a flexible portion between said operating portion and said valve head for providing self-adjustment of said valve head into closing position, a piston connected to the lower end of the stem and slidable in said liquid chamber, a liquid supply passage in said valve stem and head communicating said liquid chamber with said brewing chamber, and means for supplying liquid to said liquid chamber.

2. In a beverage brewing apparatus, the combination of a source of brew water, a brewing chamber having a brew discharge port and a used grounds disposal opening at its bottom, a filter contained in said chamber between said port and opening, means for opening and closing said brew discharge port, a valve head for opening and closing the said grounds disposal opening, a stem for operating said head, a passage in said stem extending through the head, the said passage being connected to the said source of brew water, means for controlling the quantity of brew water injected into the said brewing chamber through said passage, separate means for controlling the operation of said valve head for opening and closing said used grounds disposal opening, and a check valve in said head for preventing the passage of coffee grounds from said chamber into said passage.

References Cited in the file of this patent

UNITED STATES PATENTS

| | | |
|---|---|---|
| 461,372 | Smith | Oct. 13, 1891 |
| 1,003,317 | Bargallo | Sept. 12, 1911 |
| 1,008,861 | Piaseczny | Nov. 14, 1911 |
| 1,339,195 | Grover | May 4, 1920 |
| 1,346,898 | Kingsbury | July 20, 1920 |
| 1,506,712 | McAllen | Aug. 26, 1924 |
| 1,668,540 | McAllen | May 1, 1928 |
| 1,709,657 | Clinton | Apr. 16, 1929 |
| 2,094,981 | Fromwiller | Oct. 5, 1937 |
| 2,123,331 | Fromwiller | July 12, 1938 |
| 2,143,780 | Kime | Jan. 10, 1939 |
| 2,295,993 | Greuttner | Sept. 15, 1942 |
| 2,381,965 | Berry | Aug. 14, 1945 |
| 2,394,885 | Baak | Feb. 12, 1946 |
| 2,447,692 | Evensen | Aug. 24, 1948 |
| 2,533,296 | Stuart | Dec. 12, 1950 |
| 2,569,820 | Locke | Oct. 2, 1951 |
| 2,575,704 | Clark | Nov. 20, 1951 |
| 2,589,221 | Burgess | Mar. 18, 1952 |
| 2,589,222 | Burgess | Mar. 18, 1952 |
| 2,619,566 | Mahoney | Nov. 15, 1952 |
| 2,622,504 | Crate | Dec. 23, 1952 |
| 2,629,663 | Fogler et al. | Feb. 24, 1953 |
| 2,634,749 | Cone | Apr. 14, 1953 |
| 2,639,078 | Karlen | May 19, 1953 |
| 2,641,992 | Clemens | June 16, 1953 |
| 2,730,034 | Svendsgaard | Jan. 10, 1956 |
| 2,734,826 | Stentz et al. | Feb. 14, 1956 |
| 2,811,098 | Pavlecka | Oct. 29, 1957 |
| 2,827,845 | Richeson | Mar. 25, 1958 |